United States Patent [19]

Hicks

[11] 3,943,787
[45] Mar. 16, 1976

[54] GEARS
[75] Inventor: Raymond John Hicks, Llanwrthwl near Llandrindod Wells, Wales
[73] Assignee: Vickers Limited, London, England
[22] Filed: Apr. 3, 1975
[21] Appl. No.: 564,756

[30] Foreign Application Priority Data
 Apr. 18, 1974 United Kingdom............ 17150/74

[52] U.S. Cl. ................... 74/410; 74/411; 74/801
[51] Int. Cl.² .................... F16H 57/00; F16H 1/28
[58] Field of Search............. 74/411, 410, 801

[56] References Cited
UNITED STATES PATENTS
2,102,167   12/1937   Rotter ......................... 74/411
3,303,713   2/1967    Hicks .......................... 74/801 X
3,381,548   5/1968    Wolkenstein ................. 74/411

*Primary Examiner*—Leonard H. Gerin
*Attorney, Agent, or Firm*—Thomas C. Wettach; Arland T. Stein

[57] ABSTRACT

A gear wheel support of composite construction and comprising a gear wheel support sleeve with an internal abutment pillar secured in abutting relationship with an abutment pillar protruding from a face of a carrier, these pillars together comprising a flexible spindle co-axial with the sleeve with an annular clearance between this spindle and the sleeve.

18 Claims, 13 Drawing Figures

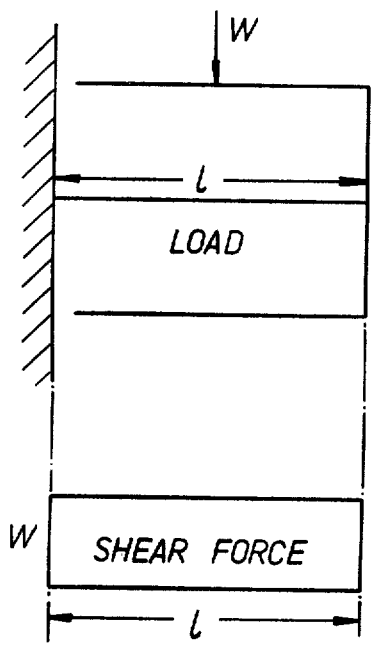
FIG. 3A
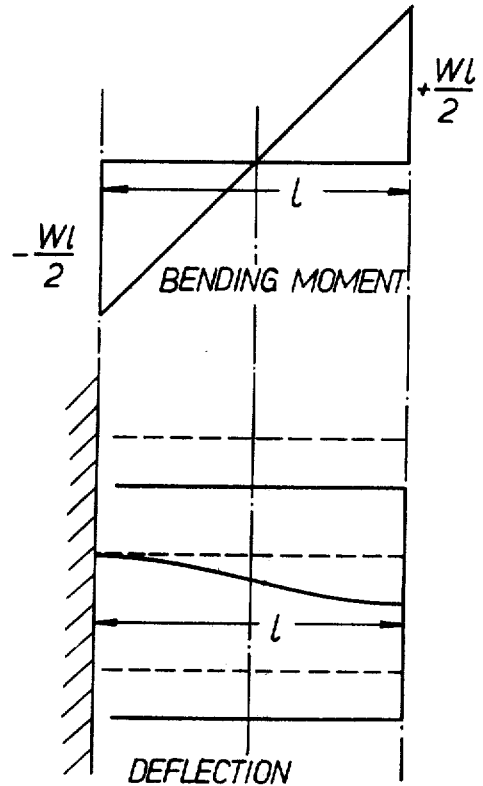
FIG. 3.B

GEARS

This invention relates to gears, and whilst primarily concerned with the mounting of pinions in epicyclic gearing, may also be applicable to other forms of parallel shaft mounted gear trains. The expression "epicyclic gearing" is used herein to refer to gear arrangements comprising a central sun pinion, a plurality of planet pinions meshed therewith, and an annulus gear surrounding the planet pinions and meshed therewith; the planet pinions being supported on cantilevered spindles which are mounted upon a carrier which may be static or rotational in operation.

In consideration of epicyclic gearing that utilises cantilever planet pinion mountings, attached to a rotational carrier, for the purpose of facilitating a load sharing function, in a manner similar to that which is described in British Pat. No. 1,101,131, difficulty has been experienced in pre-determining the extent of individual spindle flexure, and of ensuring the similar behaviour of a complete set of spindles so mounted. This is because with cantilevered spindles, secured to carriers and to pinion support sleeves by the use of interference fits, their deflections, under the influence of forces acting within the gearing configuration, arise partly from normal elastic deformation of the spindle and partly from minute relative movements between surfaces in contact at the engagement of the spindle with the carrier and the engagement of the spindle with the co-axial spindle support sleeve. The small movements cause indeterminate friction forces. The interference fits required for such an arrangement are dependent on workshop tolerances. It is thus difficult to control or determine this dependent component of deflection.

The total deflection is of particular importance when radial deflections of the spindle occur due to centrifugal force, causing excursions of the planet pinions in excess of the tolerable displacement for the correct meshing of the planet pinions with their mating gears. For example, such conditions arise in cases where the planet carriers operate at high rotational speeds, as for aircraft or gas turbine applications, or where the effective mass, angular velocity, and geometrical location of the flexible pin assemblies, including the planet pinions, combine towards the generation of centrifugal forces causing deflections in the radial direction greater than can be accepted.

A further shortcoming of such methods of planet pinion support, in cases where centrifugal loading becomes significant, is that the centroid of the assembly comprising planet pinion, bearing, co-axial sleeve, and flexible spindle, tends to be located beyond the transverse plane which bisects the planet pinion tooth face width, towards the unsupported end of the cantilever. This introduces speed dependent couples which cause mal-distribution of tooth load and incorrect meshing of the gear teeth. In order to avoid such undesirable features the centre of mass of the assembly should lie in the transverse plane coincident with the plane in which the width of the tooth face is bisected. In this condition the axes of the planet pinions will remain parallel to that of the sun pinion and the annulus gear, irrespective of transmitted loads or the rotational speed prevailing.

According to one aspect of the present invention there is provided a flexible, cantilevered, gear wheel support of composite construction and comprising a gear wheel support sleeve with an internal abutment pillar secured in abutting relationship with an abutment pillar protruding from a face of a carrier, these pillars together comprising a flexible spindle carrying the gear wheel support sleeve and capable of deflecting elastically, in use of the support, under gear load, the spindle being co-axial with the sleeve with an annular clearance between this spindle and the sleeve.

According to another aspect of the present invention there is provided a gear train having gear wheels mounted on gear wheel supports, each support being as just defined, and in which the pillars abut one another at a point along the spindle formed thereby that is the point of contraflexure of the spindle when, in use of the support, the spindle deflects under gear load; this point of contraflexure, the abutment faces of the pillars and the effective centre of mass of the support being in a common plane transverse of the spindle and that contains the line of action of the gear tooth load.

For a better understanding of the invention and to show how the same may be carried into effect, reference will not be made, by way of example, to the accompanying drawings, in which.

Figure 1:
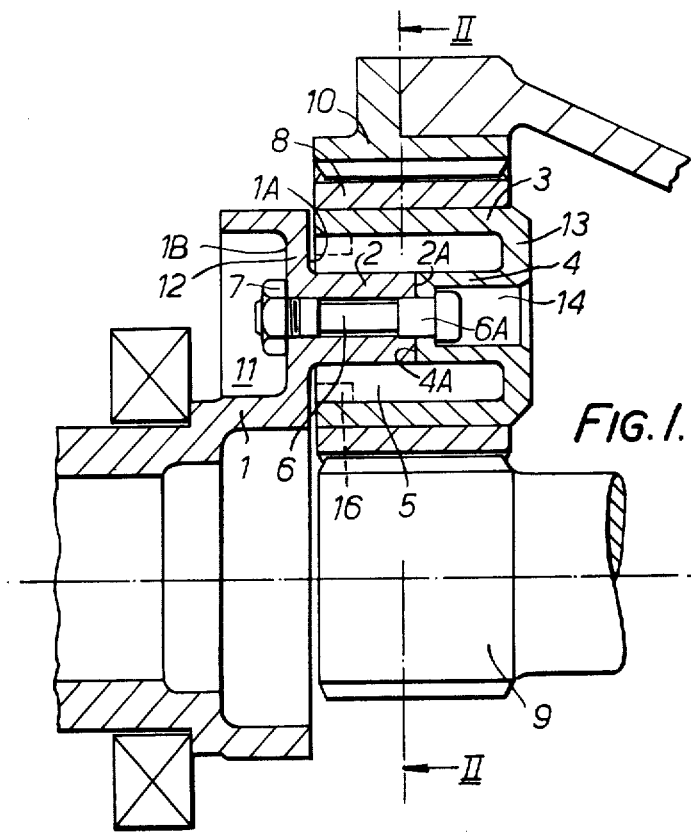
FIG. 1 is a detail, in sectional side view, of an epicyclic gearing.
Figure 2:
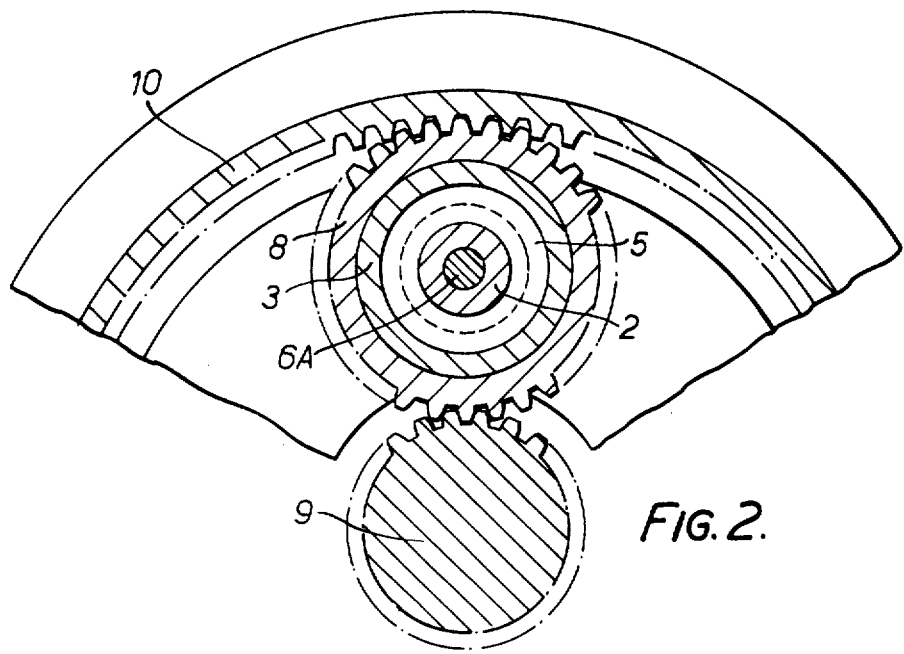
FIG. 2 is a section taken on the line II—II of FIG. 1.
Figure 4:
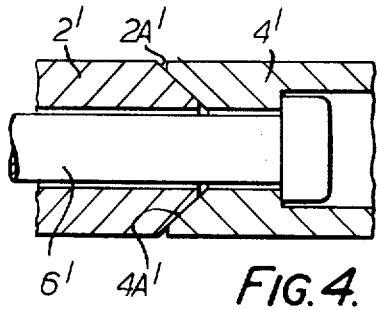
Figure 5:
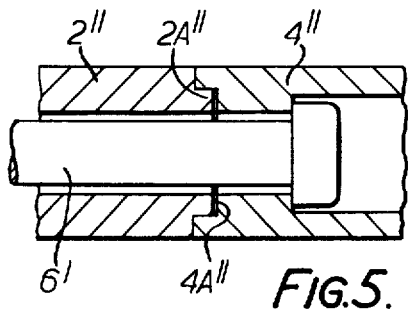
Figure 6:
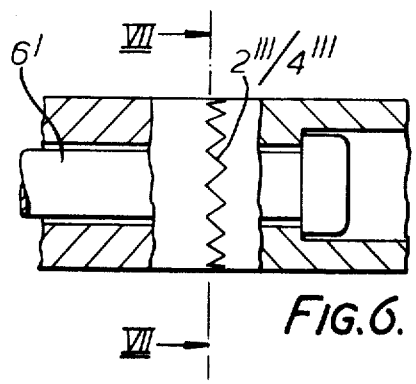
Figure 7:
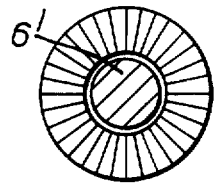
Figure 8:
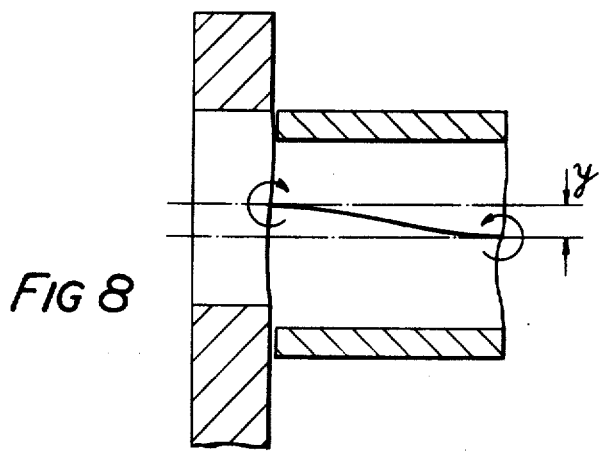
Figure 9:
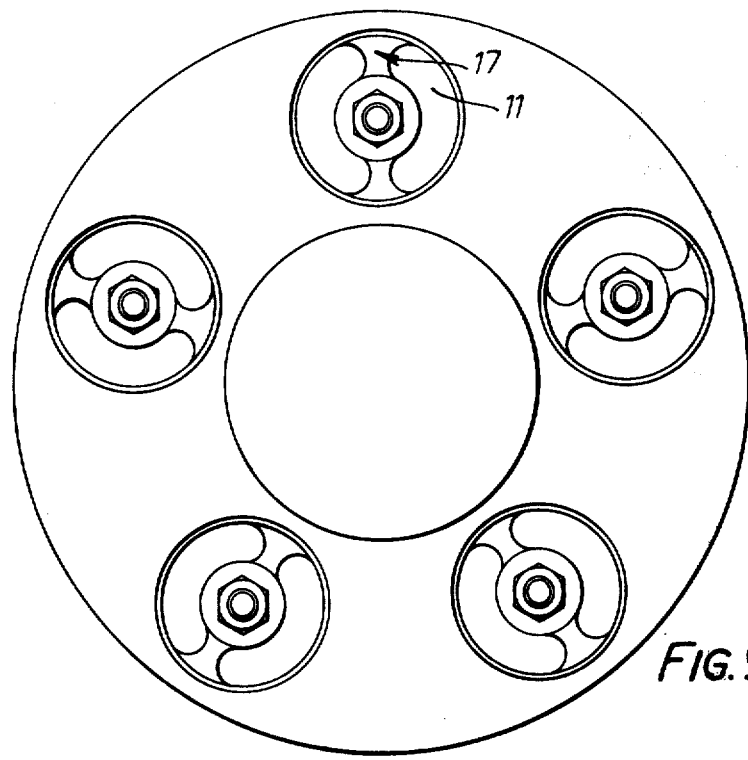
Figure 10:
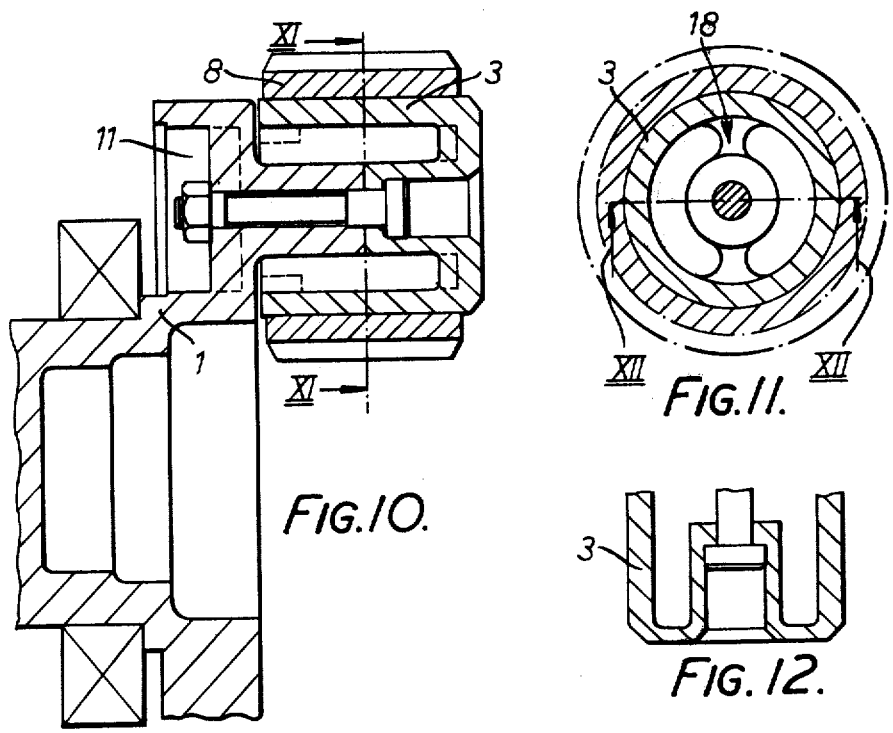
Figure 11:
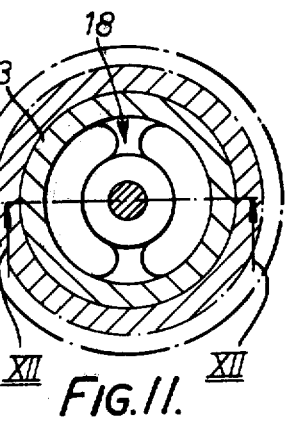
Figure 12:
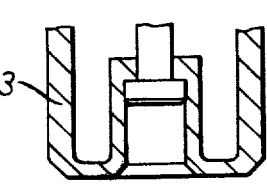

FIGS. 3A and 3B are load, sheer force, bending moment and deflection diagrams relative to the gear of FIGS. 1 and 2, FIGS. 4, 5 and 6 are similar side views of alternative forms of a detail of the gear of FIGS. 1 and 2, FIG. 7 is a section taken on the line VII—VII of FIG. 6, FIG. 8 is a diagram illustrating deflection patterns that occur in the gear of FIGS. 1 and 2, FIG. 9 is an elevation of an epicyclic gear, FIG. 10 is a sectional side view of a detail of the gear of FIG. 9, FIG. 11 is a sectional view taken on the line XI—XI of FIG. 10, and FIG. 12 is a sectional view taken on the line XII—XII of FIG. 11.

In the gear of FIGS. 1 and 2 the carrier 1 is formed with a plurality of integral abutment pillars 2 which protrude from one common face 1A of the carrier 1. Each pillar 2 has associated with it a sleeve 3 with an internal abutment pillar 4 that abuts the pillar 2, at faces 2A, 4A of the pillar 2 and the pillar 4 respectively, in such a manner that the sleeve 3 is positioned co-axially about its associated abutment pillar 2 with an annular clearance 5 around the pillar 2. Each sleeve 3 is retained with the carrier 1 by a draw bolt 6 co-axial with the associated abutment pillars 2, 4 and fastened by a nut 7 that bears against the carrier face 1B that is opposite the face 1A. Each pair of pillars 2, 4 so secured together constitutes a flexible cantilever member on which there is mounted, carried by the outer surface of the sleeve 3, a planet pinion 8 which is free to rotate thereon, but is meshed with a sun pinion 9 and an annulus gear 10.

For a better understanding of the arrangement it is necessary to consider the bending moments and sheer forces induced in the assembly in the loaded or operational configuration. These are illustrated in FIGS. 3A and 3B and it can be shown that in the ideal case with a uniformly distributed tooth load over the length of the planet pinion, which might be regarded as equal to a total tooth load "W", acting at the mid-length of the pinion, and with a flexible cantilever member in the form of a simple cantilever pin of uniform section, and length $l$, there will be a bending moment of $-(Wl/2)$ at the inner end of the pin, affixed to the carrier, and a bending moment of $+(Wl/2)$ at the outer end of the pin, affixed to the sleeve. This presupposes that the slopes at each end of the pin are equal, and that the axis of the sleeve in the deflected condition remains parallel to the axis of symmetry in the unloaded state, a necessary condition for the correct functioning of the gears. The aforementioned bending mements reduce linearly towards the mid-point of the length of the pin, at which point they vanish as this is the point of contraflexure.

In the present gear this position is chosen for the point of contact between the faces 2A and 4A of each pair of abutment pillars 2, 4, thus nullifying any tendency for the abutting surfaces to separate or become misaligned due to bending action, and hence avoiding the need for any extra tension in the bolt fastener to counter such forces. As will be seen from FIG. 3A there is a uniform shear force W throughout the length of the flexible member and it is an additional feature of the present gear to cater for the shearing action at the discontinuity (at the faces 2A, 4A) and yet preserve concentric alignment of the mating parts by means of a close tolerance fitting surface or land 6A (FIGs. 1 and 2) in the shank of the draw bolt 6. Alternatively, this can be achieved by the employment of mating male and female concentric tapered faces 2A', 4A' (FIG. 4) on pillars 2', 4'; close fitting concentric spigot 2A'' and recess 4A'' (FIG. 5) on pillars 2'', 4''; or faces 2A''', 4A''' (FIGS. 6 and 7) on pillars 2''', 4''', which faces carry co-operating radial splines, serrations, or teeth. In all these forms a pin 6' having a plain shank is used.

An additional feature provided is that flexibility is incorporated in the assembly at the base of each abutment pillar 2 by providing a circular recess 11 in the face 1B of the carrier 1, concentric with the axis of the associated pillars 2/4 so as to form a circular diaphragm 12 around the base of these pillars, the flexure of which relative to the remainder of the carrier 2 in the loaded condition will be additive to that of the abutment pillars 2/4 fast therewith. By selecting an appropriate thickness and diameter for the diaphragm 12 its flexure, when resisting bending moments carried by the abutment pillars 2/4, can be selected. Hence, under a given load, the overall deflection of the cantilevered assembly, supported by the diaphragm, resulting from elastic deformation only and not influenced by interference fits and workshop tolerances, is clearly defined and can be predetermined.

In similar manner, the circular diaphragm 13 forming the base of the internal abutment pillar 4 at the web of the sleeve 3 is likewise arranged to contribute flexibility by flexing relative to the remainder of the sleeve 3.

FIG. 8 illustrates, diagrammatically, how flexure of the diaphragms 12, 13, in the ideal case, contributes to the flexure of the member formed by the pillars 2/4, to produce overall deflection $y$, by allowing pivoting at the ends of the member 2/4. In practice, the assembly represented by each abutment pillar 2 protruding from a face of the carrier 1 and the abutting sleeve pillar 4, joined thereto by the tensioned draw bolt 6, can be a beam of non-uniform section throughout its length as shown in FIG. 1. This, however, has the disadvantage that whilst the point of contraflexure, with the bending moments applied as described previously still lies at the mid-length of the beam, the change of slope over the length of abutment pillar 2, although of opposite sign, will no longer be equal to the change of slope over the length of the abutting sleeve pillar 4 because of the different section moduli of these two parts. Consequently, in the loaded condition, the desired parallelism between the axis of the planet pinion and the axes of the mating gears would cease to be maintained but, incorporating the circular diaphragms as flexible members and selecting their thicknesses appropriately, the degree of constraint offered by each can be varied, that is the flexure that one diaphragm adds to the flexure of the member 2/4 attached thereto can be selected to be different from that which the other diaphragm adds. Thus the change of slope for each member 2, 4 of the composite member 2/4 can be controlled to give equal changes of slope each side of the mid-point of the member thereby to ensure that parallelism is maintained, independent of load, within the elastic properties of the material from which the component parts are made.

Alternatively, flexibility at the bases of the abutment pillars 2 may be provided by forming an annular channel in the face 1B of the carrier 1, the pitch circle of which is coincident with that of the pillars 2. The thickness at the base of this channel and the width of the channel at the base can be selected to control the degree of constraint as in the case of the circular diaphragms.

In order to nullify the effects of centrifugal force which in some cases can be significant and likely to prevent the correct meshing of the gears, it becomes necessary to ensure that in the radially deflected configuration of each member 2/4, the sleeve 3 remains parallel to the axis of symmetry as for tangential deflections, and this is achieved by ensuring that the centroid of the cantilevered planet pinion mounting is contained within the same plane as that which contains the center of action of the tooth load.

FIG. 1 shows the construction adopted to lighten the sleeve pillar 4, by the provision of a recess 14 for accepting the head of the draw bolt 6, which itself is positioned as close as practicable to the point of contraflexure, thus ensuring that the mass centre of each cantilevered assembly similarly lies as close as possible to this position. The mass centre of the remaining components of the assembly which are not coincident with the point of contraflexure, viz: the major part of the shank of the draw bolt 6, and the nut 7 and the protruding abutment pillar 2 integral with the carrier 1, will be seen to lie on the carrier side of the desired position. Thus by selection of mass distribution, the moment of action of the two centroids can be combined to effect a unified centroid, positioned so as to be coincident with the point of contraflexure. A further feature for positioning the centre of mass in the desired location, whilst not imparing the flexibility of the member 2/4, may be achieved by introducing a slight increase of section within the unsupported end of each sleeve 3, as shown at 16 in FIG. 1.

It has been explained that with the gear proposed, in which flexible diaphragm-like supports are positioned at the ends of the spindles constituted by the members 2/4, the flexure of the supports together with their respective draw bolts can contribute to the elasticity of the spindle assemblies to produce a deflection pattern similar to that shown in FIG. 8. This diagram illustrates the effect of a load which passes through the centroid of the spindle assembly. In such cases, the spindle assembly will flex in the manner shown, irrespective of the direction of loading, and flexure will occur in the plane transverse to the axis of rotation. In practice, the planet pinion receives one component of load in the tangential direction, due to forces transmitted through the gear, and a second component of load in the radial direction due to centrifugal force. The resultant force derived of these two components produces excursions of the planet pinions about their true mounting centers.

In order to cater for cases where the centrifugal loading is particularly high, it becomes necessary to impose a limit on the radial component of deflection, and it is in the following manner that such directional restrictions of spindle flexure may be achieved, to enable the carrier member to be operable at very high rotational speeds. The total spindle flexure is therefore proportioned such that the assembly is more resistive to radial loads than to tangential loads.

Referring now to FIGS. 9 to 12, this further additional feature is achieved by the introduction of stiffening webs 17 in the carrier recesses 11, (or in the annular channel that can replace these recesses 11), and/or similar webs 18 at the sleeve 3. The webs are arranged integrally with each diaphragm support in such a manner as to provide resistance to loads which are imposed in the radial direction thereby to constrain the cylindrical outer surface of the sleeve to remain parallel to the axis of rotation of the gears in the specific deflecting condition, the webs 17 and 18 being formed at each end of kidney-shaped portions of the recesses in the spindle support diaphragms.

It is by means of the combined spindle and diaphragm flexure obtainable by constructing to the configuration so described that excusions from the true mounting centre of each planet pinion so mounted will perform a load sharing function within the gear train, and yet ensure accurate engagement of all meshing gear teeth at proportionally higher rotational carrier speeds than would be obtainable by existing methods of planet pinion mounting.

The flexural excursions of the assembly, under operational loads, in the radial direction or in the tangential direction, can be controlled independently or proportionally as may be desired by selecting the dimensions of the stiffening webs.

If desired, instead of the pillars 2, 4 being integral with the carrier 1 and sleeve 3 respectively, as is the case in the construction so far described, they may be formed separately from the carrier 1 and sleeve 3, and respectively secured to the carrier 1 and sleeve 3 by electron beam welding.

I claim:

1. A gear wheel support of composite construction and comprising a gear wheel support sleeve, an internal abutment pillar fast with the gear wheel support sleeve, a carrier, and an abutment pillar protruding from a face of the carrier, the pillar being secured in abutting relationship and together comprising a flexible spindle co-axial with the sleeve, and carrying the gear wheel support sleeve, this spindle being capable of deflecting elastically, in use of the support, under gear load, there being an annular clearance between the spindle and the sleeve.

2. A gear wheel support according to claim 1, wherein the pillars abut one another at a point along the spindle formed thereby that is the point of contraflexure of the spindle when, in use of the support, the spindle deflects under gear load.

3. A gear wheel support according to claim 2 and further comprising a nut and bolt securing the pillars in said abutting relationship, the bolt being co-axial with the pillars.

4. A gear wheel support according to claim 3, wherein the head of said bolt is positioned on one side of what is the point of contraflexure of the spindle in use of the support, the bolt head being disposed in a recess in the sleeve pillar so as to be close to said point; and wherein the major part of the shank of the bolt, the nut that secures the bolt, and the carrier abutment pillar all lie on the other side of this point, the arrangement being such that in operation the effective centre mass of the support is coincident with said point of contraflexure.

5. A gear wheel support according to claim 4, wherein the sections of the pillars differ from one another whereby the flexing characteristics of the pillars differ from one another by a predetermined extent.

6. A gear wheel support according to claim 5, wherein the section of the sleeve is increased at a zone that lies on said other side of said point.

7. A gear wheel support according to claim 3, wherein the bolt has a land along its shank that is a close tolerance fit in the pillars where they abut one another.

8. A gear wheel support according to claim 3, wherein the pillars abut one another at mating female and male concentric tapered faces.

9. A gear wheel support according to claim 3, wherein the pillars abut one another at a close fitting concentric recess and engaging spigot arrangement.

10. A gear wheel support according to claim 3, wherein the abutting faces of the pillars carry cooperating radial splines, serrations or teeth.

11. A gear wheel support according to claim 1, wherein the zones of the carrier and the sleeve at which the respective ends of the pillars are secured to the carrier and the sleeve are of diaphragm form so as to be capable of flexing relative to the remainder of the carrier and sleeve, flexure of the zones in use of the support being additive to flexure of the spindle.

12. A gear wheel support according to claim 11, wherein the flexing characteristics of said zones are such that the flexure which one adds to flexure of the spindle differs from the flexure which the other adds to flexure of the spindle.

13. A gear wheel support according to claim 12, wherein said zone of the carrier is formed by the base of a circular recess in the carrier.

14. A gear wheel support according to claim 12, wherein said zone of the carrier is formed by the base of a channel in the carrier.

15. A gear wheel support according to claim 12, wherein either or both of said zones are stiffened to provide resistance to loads imposed in the radial direction in operation.

16. A gear wheel support according to claim 1, wherein the support sleeve pillar is integral with the support sleeve; and wherein the carrier pillar is integral with the carrier.

17. A gear wheel support according to claim 1, wherein the support sleeve pillar is united with the support sleeve by means of a weld effected by electron beam welding; and wherein the carrier pillar is united with the carrier by means of a weld effected by electron beam welding.

18. A gear train having gear wheels mounted on gear wheel supports, each support being of composite construction and comprising a gear wheel support sleeve, an internal abutment pillar fast with the gear wheel support sleeve, a carrier, and an abutment pillar protruding from a face of the carrier, the pillars being secured in abutting relationship and together comprising a flexible spindle co-axial with the sleeve, and carrying the gear wheel support sleeve, this spindle being capable of deflecting elastically, in use of the support, under gear load, there being an annular clearance between the spindle and the sleeve, and in which the pillars abut one another at a point along the spindle formed thereby that is the point of contraflexure of the spindle when, in use of the support, the spindle deflects under gear load; this point of contraflexure, the abutment faces of the pillars and the effective centre mass of the support being in a common plane transverse of the spindle and that contains the line of action of the gear tooth load.

* * * * *